(12) United States Patent
Spink et al.

(10) Patent No.: US 6,416,725 B1
(45) Date of Patent: Jul. 9, 2002

(54) REMOVAL OF CONTAMINANTS FROM GAS STREAMS IN RAYON PRODUCTION

(75) Inventors: Edward F. Spink, Waterloo; Christopher R. Mueller, Kitchener, both of (CA)

(73) Assignee: Turbotak Technologies Inc., Waterloo (CA)

( * ) Notice: Subject to any disclaimer, the term of this patent is extended or adjusted under 35 U.S.C. 154(b) by 0 days.

(21) Appl. No.: 09/424,118

(22) PCT Filed: May 21, 1998

(86) PCT No.: PCT/CA98/00498

§ 371 (c)(1),
(2), (4) Date: Feb. 22, 2000

(87) PCT Pub. No.: WO98/52680

PCT Pub. Date: Nov. 26, 1998

Related U.S. Application Data

(60) Provisional application No. 60/047,319, filed on May 21, 1997.

(51) Int. Cl.⁷ .......................... B01D 53/48; B01D 53/52
(52) U.S. Cl. .................. 423/220; 423/234; 423/243.01; 423/243.08; 423/243.11
(58) Field of Search ................................ 423/220, 234, 423/243.01, 243.08, 243.11

(56) References Cited

U.S. PATENT DOCUMENTS

| | | | |
|---|---|---|---|
| 4,037,039 A | 7/1977 | Geyer, Jr. et al. | 536/60 |
| 4,158,698 A | 6/1979 | Geyer, Jr. et al. | 422/189 |
| 4,368,078 A | 1/1983 | Angelini et al. | 106/164 |
| 4,477,951 A | 10/1984 | Geyer, Jr. et al. | 28/246 |
| 5,192,517 A | 3/1993 | Spink | 423/243.08 |

FOREIGN PATENT DOCUMENTS

| | | | | |
|---|---|---|---|---|
| DE | 41 29 566 A1 | | 3/1993 | |
| DE | 43 04 143 A1 | | 8/1994 | |
| FR | 1 591 828 A | | 6/1970 | |
| GB | 1224928 | * | 3/1971 | |
| JP | 48-3751 | * | 2/1973 | ................. 423/234 |
| JP | 51-9098 A | * | 1/1976 | ............ 423/243.11 |
| JP | 62-71516 A | * | 4/1987 | ............ 423/243.01 |

OTHER PUBLICATIONS

English Abstract for DE 43 04 143 A1, Aug. 1994.*
Database WP1 Section Ch., Week 8909, Derwent Publications Ltd., London, 89–064215 XP 002075898 for JP 01 015 117A (Denryoku Chuo Kenkyusho) see abstract Jan. 19, 1989.

* cited by examiner

Primary Examiner—Steven P. Griffin
Assistant Examiner—Timothy C Vanoy
(74) Attorney, Agent, or Firm—Sim & McBurney

(57) ABSTRACT

Sulfurous gas streams comprising hydrogen sulfide and carbon disulfide, such as produced as a by-product of the rayon-forming process, are processed to recover the components in a useable form. The gas stream first is contacted with an aqueous sodium hydroxide to dissolve out hydrogen sulfide and some of the carbon disulfide. The dissolved carbon disulfide is driven off from the solution and condensed as a liquid concentrate. Carbon disulfide remaining the gas stream is recovered, such as by condensation. The aqueous sodium sulfide solution which remains from removal of carbon disulfide is concentrated and the pH is adjusted, as necessary, to a value at which the sodium sulfide is predominantly in the form of sodium bisulfide. The concentrated sodium bisulfide solution is capable of reuse in the rayon-forming process along with the liquid concentrate of carbon disulfide.

17 Claims, 4 Drawing Sheets

REMOVAL OF CONTAMINANTS FROM GAS STREAMS IN RAYON PRODUCTION

REFERENCE TO RELATED APPLICATIONS

This application is a national phase application under 35 U.S.C. 371 of PCT/CA98/00498 and claims benefit of provisional application Ser. No. 60/047,319 filed May 21, 1997.

FIELD OF INVENTION

The present invention relates to the treatment of gas streams to remove, concentrate and recover in unsable form, contaminants therefrom, particularly gas streams produced in rayon production.

BACKGROUND TO THE INVENTION

Rayon is prepared by the so-called well-known viscose process. In this process, cellulose xanthate solution first is prepared from cellulose and then is spun into fibre. The preparation of the cellulose is xanthate solution requires an initial conversion of the cellulose to alkali cellulose by steeping in aqueous sodium hydroxide solution followed by pressing under high pressure to provide a gel-like alkali cellulose comprising about 34 wt % cellulose, about 15.3 wt % caustic and the remainder water. The alkali cellulose then is shredded to a crumblike material. The shredding step also serves to more uniformly distribute the caustic in the alkali cellulose crumb. The shredded crumb then is aged.

The aged alkali cellulose next is subjected to a xanthanation reaction using carbon disulfide by the so-called dry churn or other methods operating with addition of carbon disulfide at atmospheric pressure or at reduced pressure into evacuated churns containing alkali-cellulose crumb. Exothermic reaction of the alkali-cellulose and carbon disulfide in the xanthanation step usually is effected at about 32° to 33° C. and is usually completed in about 75 to 90 minutes. By-product formation, usually in the form of trithiocarbonate, produces a yellow coloration to the xanthanated product and is a source of hydrogen sulfide evolution during subsequent spinning of the rayon fibre. Hence it is preferred to operate in a manner to minimize such by-product formation.

The cellulose xanthate crumb resulting from the xanthanation reaction then is placed in large stirred tanks containing a dilute sodium hydroxide solution, to dissolve the cellulose xanthate into solution and to form a clear, honeylike, viscous dope known as viscose. The viscose solution is formed at low temperature to inhibit trithiocarbonate formation, which is undesirable. Ripening of the viscose solution to effect redistribution of the xanthate groups then proceeds prior to spinning. This step also produces the requisite xanthate concentration.

The ripened cellulose xanthate solution next is spun by extruding the viscose into a bath containing salt and acid. The salt usually is sodium sulfate and sulfuric acid usually is employed as the acid. The presence of the sulfuric acid in the spinning bath results in a reaction with the by-product trithiocarbonate formed in the xanthanation reaction and the formation of sulfurous gases, mainly hydrogen sulfide and carbon disulfide. These gases are currently exhausted to atmosphere resulting in costly chemical losses and hazardous emissions. Alternatively, scrubbing operations are employed to effect their removal with the resulting low concentration product being sewered.

A search of the records of the US Patent has been conducted with respect to the present invention and the following prior art has been located as the closest relevant prior art:

U.S. Pat. No. 4,477,951, U.S. Pat. No. 4,368,078, U.S. Pat. No. 4,037,039, GB 789,691, U.S. Pat. No. 4,158,698,

SUMMARY OF INVENTION

The present invention is concerned with a procedure for the processing of the sulfurous gas-containing off-gas streams, comprising hydrogen sulfide and carbon disulfide, from the rayon spinning process and to recover these chemicals in a form which is reusable in the rayon-forming process or saleable as a commodity. While the invention is particularly described with reference to the sulfurous by-product gas stream from the rayon-making process, the invention also is applicable to other similarly-compositioned sulfurous gas streams from other industries producing a hydrogen sulfide-containing gas stream. The invention is specifically described herein with respect to the processing of the off-gas stream from the rayon spinning tank, but the principles embodied therein apply equally to other off-gas streams.

In accordance with one aspect of the present invention, there is provided a method of processing a sulfurous gas stream comprising hydrogen sulfide and carbon disulfide, which comprises contacting said gas stream with an aqueous solution of sodium hydroxide to dissolve said hydrogen sulfide and a portion of said carbon disulfide therefrom and to form an aqueous solution of sodium sulfide having carbon disulfide dissolved therein and a residual gas stream containing carbon disulfide, heating said aqueous solution of sodium sulfide above a temperature where carbon disulfide separates from said solution to form gaseous carbon disulfide and an aqueous solution of sodium sulfide depleted of carbon disulfide, recovering the gaseous carbon disulfide, concentrating the resulting aqueous solution of sodium sulfide and adjusting the pH of the concentrated sodium sulfide solution so that the sodium sulfide substantially is present in the form of sodium bisulfide, and recovering the resulting concentrated aqueous solution of sodium disulfide.

GENERAL DESCRIPTION OF INVENTION

Figure 1A:
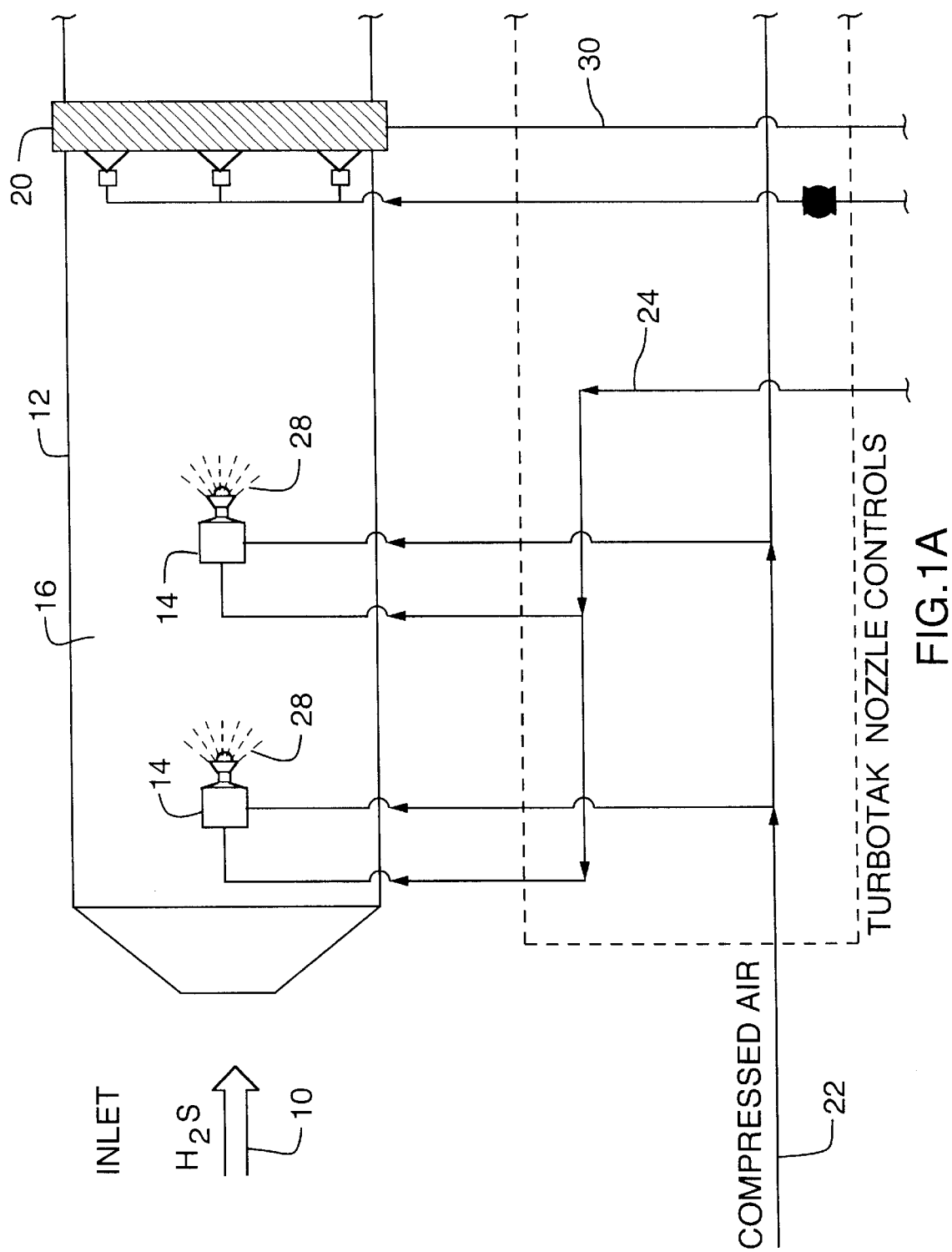
FIGS. 1A to 1D are a schematic flow sheet of one embodiment of a process according to the invention.

The initial step of the process of the invention is to contact the off-gas stream. from the rayon spinning tank with an aqueous sodium hydroxide solution to dissolve the sulfurous gases, mainly hydrogen sulfide and some carbon disulfide, from the gas stream.

The sulfurous off-gas stream contacted with the aqueous sodium hydroxide solution generally comprises hydrogen sulfide and carbon disulfide, although other sulfurous gas, such as carbonyl sulfide, also may be present in minor quantities. Such sulfurous gas stream generally has an overall sulfurous gas content of about 100 to about 10,000 ppm, preferably about 2,500 to about 5,000 ppm. The hydrogen sulfide and carbon disulfide may be present in the off-gas stream from the rayon process in a molar ratio of about 1:1. The molar ratio may vary depending on the source of the gas stream.

The aqueous sodium hydroxide solution employed to contact the off-gas stream and to dissolve the sulfurous gas components thereof generally has a concentration of up to about 50 wt %, preferably about 1 to about 10 wt % NaOH. The contacting and dissolving step may be effected over a wide temperature range, generally from about 20 to about 100° C., preferably approximately 80° C. Higher temperatures are preferred to minimize the amount of carbon disulfide dissolved in the sodium hydroxide.

The contact between the off-gas stream and the aqueous sodium hydroxide solution may be effected using any convenient efficient gas-liquid contact scrubbing device which permits dissolution of the sulfurous gases in the aqueous sodium hydroxide solution. It is preferred to use the scrubbing device and procedure described in the U.S. Pat. No. 5,192,517, assigned to the assignee hereof and the disclosure of which is incorporated herein by reference, and sometimes known as the "Waterloo Scrubber". In such device and procedure, a dual-fluid atomizing spray nozzle is used to form a countercurrent or co-current flow of a mist of minute liquid droplets of aqueous sodium hydroxide solution in the off-gas stream flowing: through a pipe. Such scrubbing procedure may be effected in one or more contact stages, followed by coalescence of the liquid droplets in which the contaminating gases now are dissolved to form an aqueous solution thereof. The resulting gas stream, now free from hydrogen sulfide but containing residual carbon disulfide, may be vented from the scrubber. The vented gas stream is further processed to recover the carbon disulfide, such as by condensation or by absorption of activated carbon, before the purified air stream is vented to atmosphere.

The scrubbing operation: effected in the waterloo scrubber may be carried out at an convenient gas/liquid ratio which enables the white gas to be dissolved in the droplets of aqueous sodium hydroxide solution. Generally, the scrubber may be operated at a gas/liquid ratio of about 0.5 to about 20, preferably about 1 to about 3, US gallon/1000 cfm.

The aqueous sodium hydroxide solution is collected and recirculated to effect. contact with further gas stream, which has the effect of concentrating the aqueous sodium sulfide solution, until the desired concentration level of sodium sulfide, as sodium bisulfide ($N_aHS$),, is obtained for the intended reuse or sale of the product, which may be any desired concentration of sodium sulfide, optionally about 40 to about 45 wt % for reuse in the rayon-making process.

The dissolution of hydrogen sulfide in the sodium hydroxide has the effect of lowering the pH of the sodium hydroxide solution. In view of the significantly greater solubility of sodium bisulfide (NaHS) in sodium hydroxide in comparison to sodium sulfide ($Na_2S$), it is desired to provide the aqueous sodium sulfide solution at a pH at which NaHS predominates as the dissolved species. The pH preferably is about 10 to about 11.

As the concentration of dissolved sodium sulfide increases it may be necessary to adjust the pH of the solution to the desired range, generally by the addition of acid.

The sodium bisulfide solution which is produced following this procedure possesses a concentration and quality which permits the reuse of the solution in the chemical processes described above in connection with the rayon-forming process and/or the aqueous sodium bisulfide solution may be sold as a commercial by-product of the rayon-forming process or other process to which the present invention is applied.

An additional effect of the scrubbing of the off-gas stream from the spinning,.step of the rayon-forming process by an aqueous sodium hydroxide solution in accordance with the present invention is the unexpected coabsorption of some carbon disulfide from the gas stream into the aqueous sodium hydroxide solution under the conditions of operation of the scrubbing step.

The absorbed carbon disulfide may be recovered from the aqueous sodium hydroxide solution resulting from the contacting step by heating the solution to a temperature of generally about 70 to about 90° C., preferably about 80° C., to drive off the carbon disulfide from the solution in gaseous form and then condensing the carbon disulfide (which has a boiling point of about 46° C.) to form liquid concentrated carbon disulfide. Such procedure may be facilitated by adding the vaporized carbon disulfide to the exhaust gas stream from the scrubber.

The carbon disulfide recovered from the hydrogen sulfide depleted gas stream and from the aqueous sodium hydroxide solution then can be used in the cellulose xanthate forming step, or otherwise employed in any convenient manner.

The ability to recover hydrogen sulfide produced as a by-product gas from the rayon-spinning process in the form of sodium bisulfide and the ability to recover carbon disulfide also produced as a by-product gas from the rayon-spinning process, both in a form useable in the rayon-forming process, by scrubbing the gas stream with aqueous sodium hydroxide solution and then processing the resulting aqueous medium as described herein, represents a significant improvement in the overall economies of the rayon-forming process.

DESCRIPTION OF PREFERRED EMBODIMENT

Figure 1B:
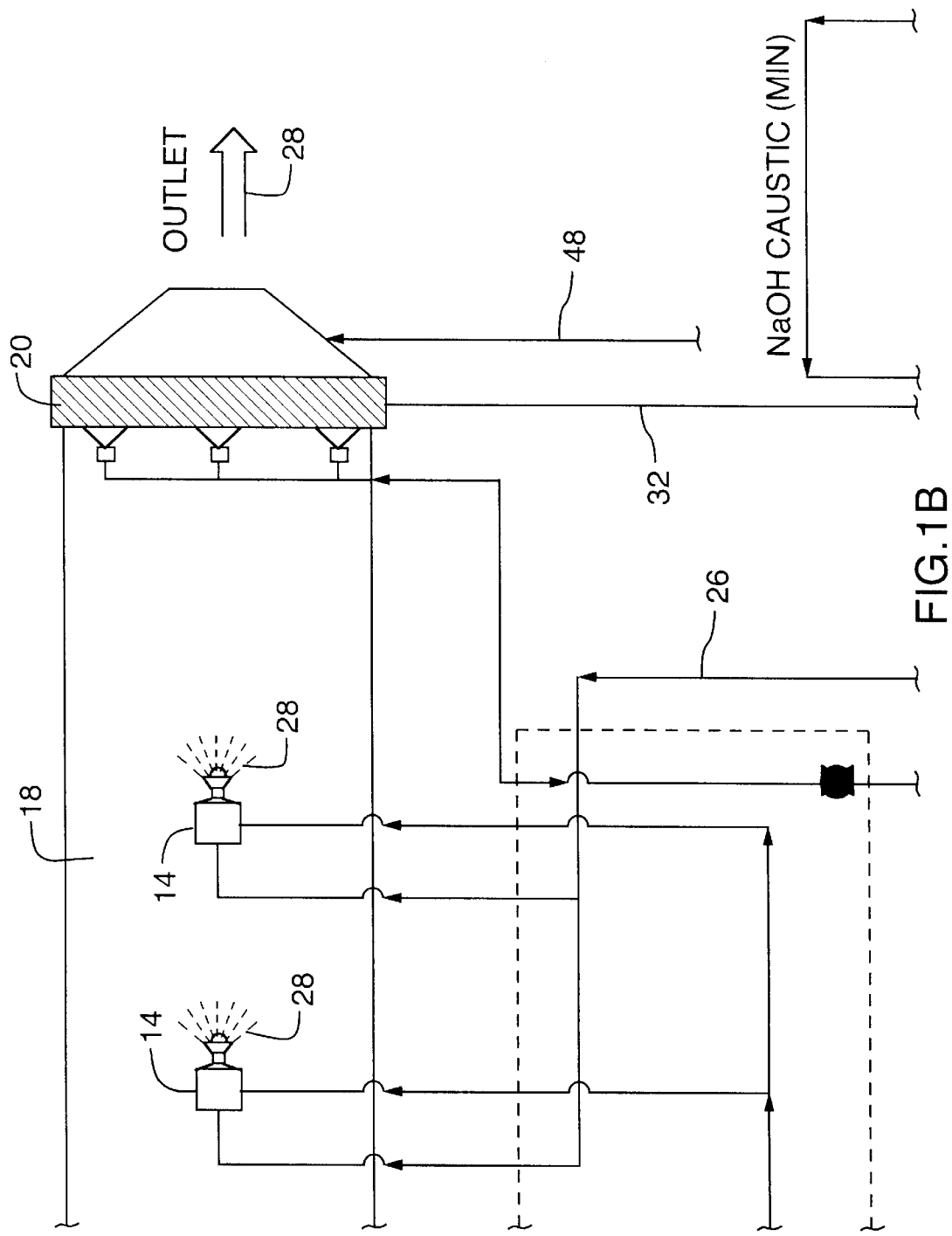
Figure 1C:
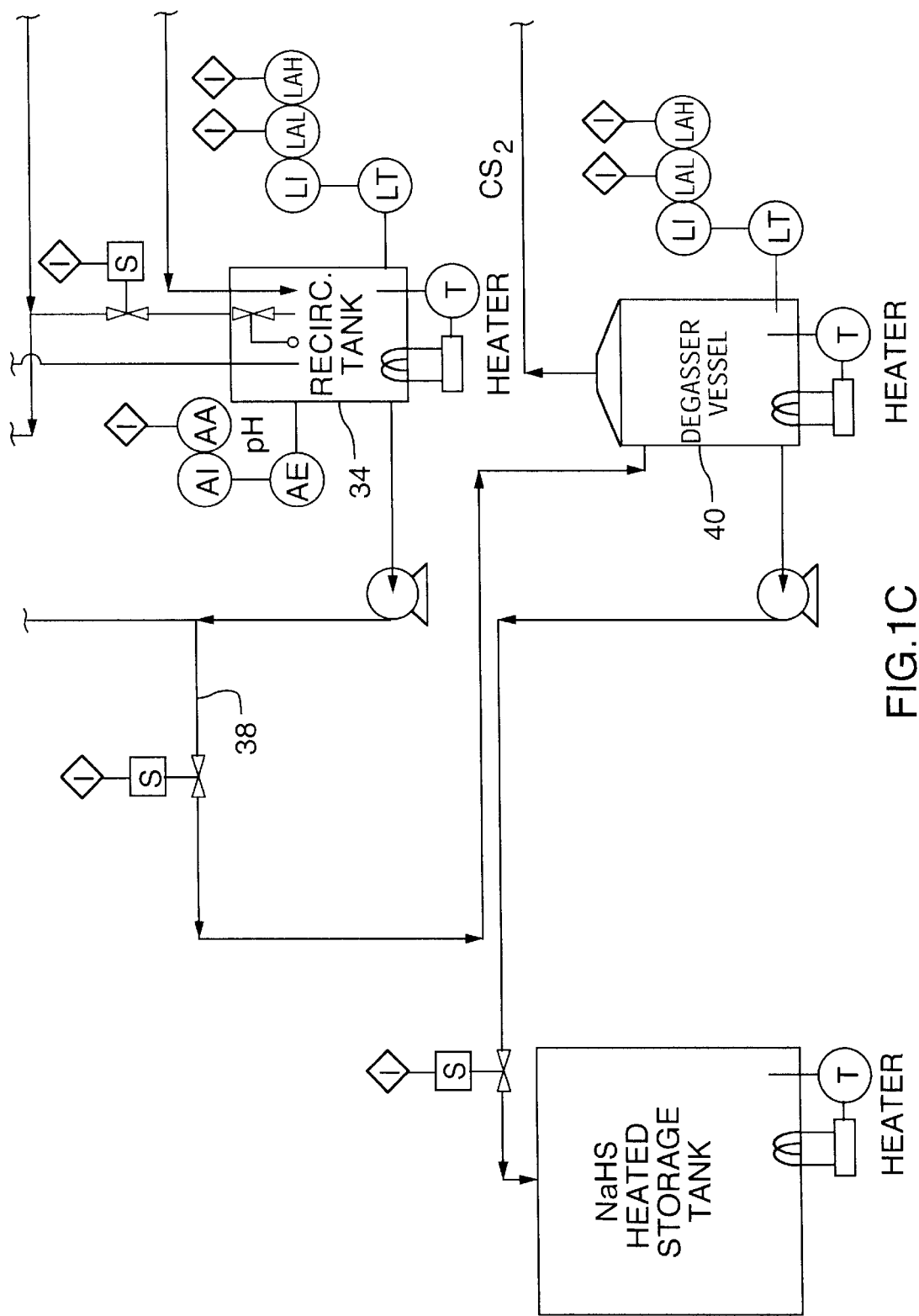
Figure 1D:
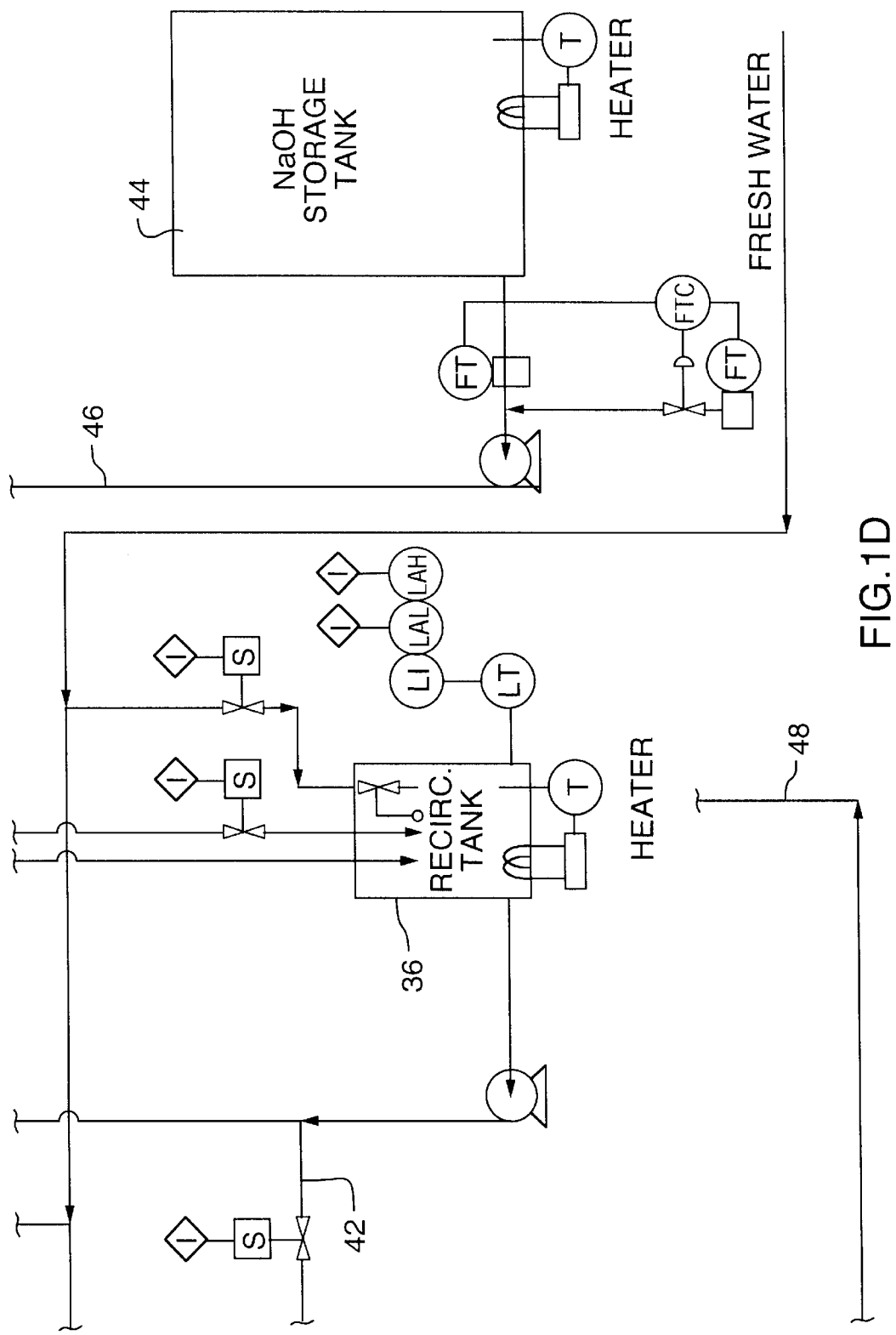

Referring to the drawings, in which FIGS. 1A to 1D are a schematic flow sheet of one embodiment of the invention, a gas stream 10 containing hydrogen sulfide and carbon disulfide, is fed to a scrubber 12 having a plurality of dual-fluid nozzles 14 in two compartments 16, 18. The scrubber has a demister 20 at the downstream end of each compartment 16, 18 to collect the liquid droplets and condense them. Water sprays 21 may be used to assist in the condensation process. Air is fed to each dual-fluid nozzle 14 by line 22 as are aqueous sodium hydroxide solutions by lines 24, 26. The number of dual-fluid nozzles and the compartments in the scrubber 12 may be varied as required.

Each of the dual-fluid nozzles 14 produces a spray mist 28 which contacts the gas stream flowing through the scrubber 12 to dissolve hydrogen sulfide and some carbon disulfide from the gas stream. The hydrogen sulfide-depleted gas stream containing the bulk of the carbon disulfide is vented from the downstream end of the scrubber by line 28. The carbon disulfide-containing gas stream may be. further processed in any convenient manner to recover the carbon disulfide therefrom, such as by condensation to liquid form.

The aqueous sodium sulfide solution collected at each of the demisters 20 is removed from the scrubber and forwarded by lines 30, 32 to respective recirculation tanks 34, 36. From each of the respective recirculation tanks 34, 36, the aqueous feed solutions 24 and 26 are fed to the dual-fluid nozzles 28 for contact with further incoming gas stream 10. The circulation of the aqueous sodium sulfide solution to the nozzles, condensation and collection of the aqueous sodium sulfide solution is continued until the desired concentration of dissolved sodium sulfide is reached. The pH of the solution may be adjusted intermittently or continuously to maintain the desired pH at which the sodium sulfide is substantially as sodium bisulfide.

When the desired concentration and pH levels have been achieved, a bleed stream is taken by line 38 to a degasser vessel. A corresponding volume of aqueous sodium sulfide solution is transferred from return line 26 to the recirculation tank 34 by line 42. Make up sodium hydroxide solution may be fed from a storage tank 44 by line 46 to recirculation tank 36.

In the degasser vessel 40, the aqueous sodium sulfide solution is heated to a temperature above which carbon disulfide vaporizes. The vaporized carbon disulfide is led by line 48 to the outlet gas line 28 for processing for recovery of the carbon disulfide. The desired product sodium sulfide solution is removed from the degasser vessel 40 by line 50 to a storage vessel 52.

SUMMARY OF DISCLOSURE

In summary of this disclosure, the present invention provides a novel procedure for the treatment and processing of sulfur gas-containing off-gas streams from the rayon-producing process and other processes producing similar gas streams to recover useful chemicals for sale or reuse in the rayon-producing or other process. modifications are possible within the scope of this invention.

What we claim is:

1. A method of processing a gas stream comprising hydrogen sulfide and carbon disulfide, which comprises:
    providing a two-stage gas-liquid contactor,
    contacting said gas stream with an aqueous solution of sodium hydroxide in a first stage of said gas-liquid contactor to dissolve hydrogen sulfide and carbon disulfide from said gas stream,
    contacting said gas stream with an aqueous solution of sodium hydroxide in a second stage of said gas-liquid contactor to dissolve residual hydrogen sulfide from said gas stream,
    removing a gas stream containing residual carbon disulfide and substantially free from hydrogen sulfide from the second stage of said gas-liquid contactor,
    removing aqueous sodium hydroxide solution from said first stage of said gas-liquid contactor and recycling the removed solution to contact the gas stream entering said first stage and repeating said removal and further contacting until a desired concentration of sodium bisulfide is provided in the aqueous sodium hydroxide solution in said first stage,
    removing aqueous sodium hydroxide solution from said second stage of said gas-liquid contactor and recycling the removed solution to contact the gas stream entering said second stage and repeating said removal and further contacting until said desired concentration of sodium bisulfide is provided in said aqueous sodium hydroxide solution in said first stage,
    removing the aqueous sodium bisulfide solution from the first stage, replacing the same by said aqueous sodium hydroxide solution from said second stage and replacing the second stage aqueous sodium hydroxide solution by fresh aqueous sodium hydroxide solution,
    heating the removed aqueous sodium bisulfide solution to form gaseous carbon disulfide and an aqueous solution of sodium bisulfide depleted of carbon disulfide,
    recovering the gaseous carbon disulfide, and
    recovering the resulting aqueous solution of sodium bisulfide.

2. The method of claim 1 wherein said gas stream is a by-product gas stream from spinning rayon.

3. The method of claim 2 wherein the removed carbon disulfide and said aqueous sodium bisulfide solution are used in the production of rayon.

4. The method of claim 2 wherein said gas stream has a sulfur component gas content of about 100 to about 10,000 ppm.

5. The method of claim 4 wherein said gas stream has a sulfur component content of about 2,500 to about 5,000 ppm.

6. The method of claim 2 wherein the hydrogen sulfide and carbon disulfide are present in said gas stream at a molar ratio of about 1:1.

7. The method of claim 4 wherein said contact with an aqueous solution of sodium hydroxide is effected by using an aqueous solution of sodium hydroxide having an initial concentration of up to about 50 wt % of NaOH at a temperature of about 20 to about 100° C.

8. The method of claim 5 wherein said contact with an aqueous solution of sodium hydroxide is effected by using an aqueous solution of sodium hydroxide having an initial concentration of about 1 about 10 wt % of NaOH at a temperature of about 70 to about 80° C.

9. The method of claim 7 wherein said contact with an aqueous solution of sodium hydroxide is effected by contacting the gas stream with at least one mist of the aqueous solution of sodium hydroxide effected at a gas-liquid contact ratio of about 0.5 to about 20 US gallons: 1000 ft$^3$/min.

10. The method of claim 9 wherein said gas-liquid contact ratio is about 1 to about 3 US gallons: 1000 ft$^3$/min.

11. The method of claim 2 wherein said heating of said aqueous solution to evaporate carbon disulfide from the solution is effected at a temperature of about 70 to about 90° C.

12. The method of claim 11 wherein said temperature is about 80° C.

13. The method of claim 1 wherein the aqueous solution of sodium bisulfide resulting from said repeated contacting steps in said first contacting stage has a concentration of about 40 to about 45 wt % sodium sulfide as sodium bisulfide.

14. The method of claim 13 wherein the pH of the aqueous solution of sodium bisulfide is controlled to a value of about 10 to about 11.

15. The method of claim 1 wherein said gas stream containing residual carbon disulfide and substantially free from hydrogen sulfide is processed to recover said carbon disulfide therefrom.

16. The method of claim 1 wherein said gaseous carbon disulfide is added to said gas stream containing residual carbon disulfide and substantially free from hydrogen sulfide to permit recovery of carbon disulfide.

17. The method of claim 16 wherein said carbon disulfide is recovered by condensation.

* * * * *